(12) United States Patent
Haba

(10) Patent No.: US 6,330,027 B1
(45) Date of Patent: *Dec. 11, 2001

(54) VIDEO INPUT APPARATUS WITH ERROR RECOVERY CAPABILITY

(75) Inventor: Yoshito Haba, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/693,847

(22) Filed: Aug. 5, 1996

(30) Foreign Application Priority Data

Aug. 8, 1995 (JP) .................................................. 7-221160

(51) Int. Cl.$^7$ .................................................. H04N 5/232
(52) U.S. Cl. .......................................... 348/212; 348/211
(58) Field of Search .................................. 348/552, 211, 348/212, 213, 13, 222, 220, 233, 423, 335, 396, 500

(56) References Cited

U.S. PATENT DOCUMENTS

| | | | |
|---|---|---|---|
| 5,161,026 | * | 11/1992 | Mabuchi et al. .................... 348/335 |
| 5,402,170 | * | 3/1995 | Parulski et al. .................... 348/211 |
| 5,485,208 | * | 1/1996 | Mabuchi ............................ 348/335 |
| 5,506,617 | * | 4/1996 | Parulski et al. .................... 348/552 |
| 5,524,194 | * | 6/1996 | Chida et al. ....................... 348/232 |
| 5,696,553 | * | 12/1997 | D'Alfonso et al. ................. 348/211 |
| 5,729,282 | * | 3/1998 | Okawa ............................... 348/222 |

* cited by examiner

*Primary Examiner*—Wendy R. Garber
*Assistant Examiner*—Aung S. Moe
(74) *Attorney, Agent, or Firm*—Morgan & Finnegan, LLP

(57) ABSTRACT

An image input apparatus capable of optimizing an error recovery process of data transfer between a camera unit and an image processing unit. When a communication driver of the camera unit detects a check sum error, an ACK (acknowledge) frame added with a reception error parameter is transmitted to the image processing unit. Upon reception of this ACK frame, a communication driver of the image processing unit retransmits a command frame. The communication driver of the camera unit checks the check sum of the received frame, and if there is no error, an ACK frame added with a normal reception parameter is transmitted to the image processing unit to notify an upper level control module of a command reception.

6 Claims, 10 Drawing Sheets

FID (FRAME IDENTIFIER)

01h : COMMAND FRAME

02h : V SYNC DATA FRAME

03h : ACK FRAME

PARAMETER

00h : OK

EXCEPT FOR 00h : NG

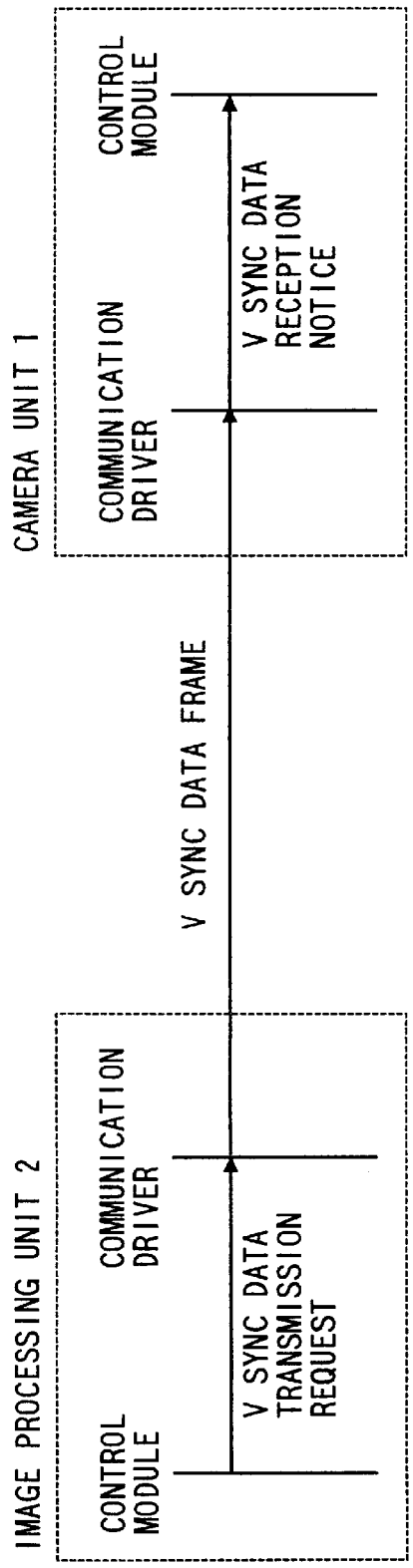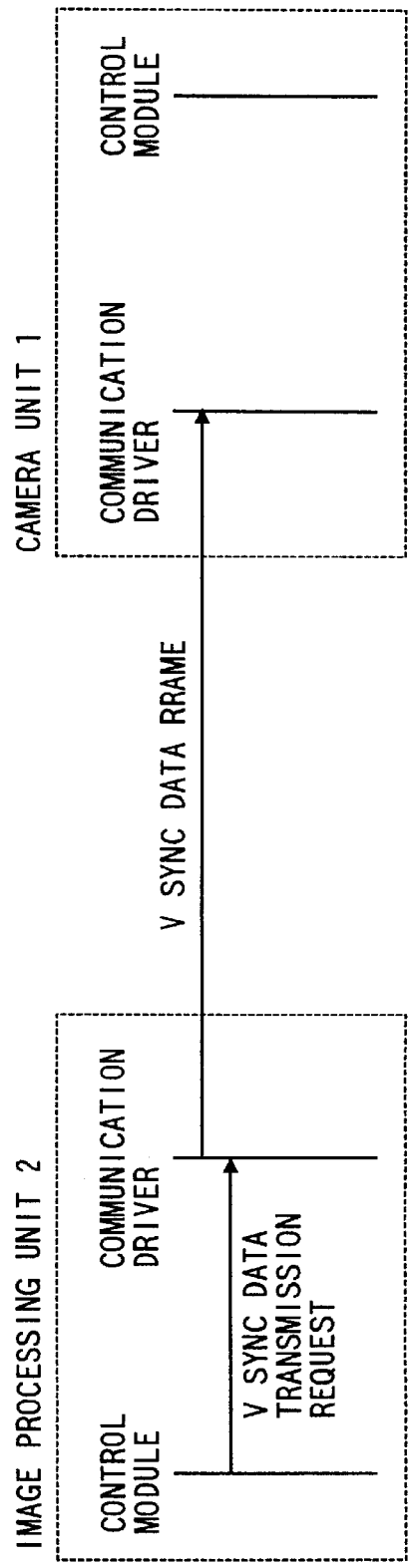

VIDEO INPUT APPARATUS WITH ERROR RECOVERY CAPABILITY

BACKGROUND OF THE INVENTION

1. Field of the Invention

The present invention relates to a video input apparatus having separated camera unit and image processing unit connected with each other via a cable.

2. Related Background Art

A conventional video input apparatus having separated camera unit and image processing unit, can replace its camera unit depending upon user's needs. Expensive components such as signal processing circuits and frame memories are used in the image processing unit, and the camera unit can be supplied at low cost.

FIG. 9 is a block diagram showing the structure of a conventional video input apparatus of a camera unit separation type. In FIG. 9, reference numeral 100 represents a camera unit, and reference numeral 200 represents an image processing unit. The camera unit 100 and image processing unit 200 are connected by a cable 300 which is detachably connected to a connector 127 of the camera unit 100 and a connector 238 of the image processing unit 200. Reference numeral 400 represents a host terminal which controls the camera unit 100 and image processing unit 200 and fetches a picked-up image.

In the camera unit 100, reference numeral 124 represents a system control unit made of a one-chip microcomputer having a CPU (central processing unit), a ROM (read-only memory), a RAM (random access memory), and functions of, for example, a control board and a communication board. Reference numeral 120 represents a pickup lens, reference numeral 121 represents an image pickup element such as a CCD, reference numeral 123 represents an image pickup element driving circuit such as a TG (timing generator) which controls the accumulation operation, read operation, and reset operation of the image pickup element 121 in response to control signals from the system control unit 124 to thereby change the shutter speed. Reference numeral 122 represents an S/H AGC circuit for a sampling and holding operation to reduce noises of accumulated charges and for a gain adjustment operation of an image pickup signal in response to control signals from the system control unit to thereby change the gain of the image pickup signal 125. The image pickup signal 125 is supplied via the cable 300 to a signal processing circuit 230 of the image processing unit 200. Reference numeral 126 represents a data line which is connected between the system control unit 124 and the connector 127, the data being transferred via the cable 300 to a system control unit 233 of the image processing unit 200.

In the image processing unit 200, reference numeral 233 represents the system control unit made of a one-chip microcomputer having a CPU, a ROM, a RAM, and functions of, for example, a control board and a communication board. The system control unit 233 performs a control of each device of the image processing unit 200, a control of an auto-white balance, a communication to and from the camera unit 100, and a communication to and from the host terminal 400 via a bus I/F circuit 235. The image processing unit 200 can be detachably mounted on an expansion slot of a computer as a PC card or a signal processing board. For this mount, the bus I/F circuit 235 is used.

Reference numeral 230 represents the signal processing unit which converts an analog video signal on the image pickup signal line 236 transferred from the camera unit 100 via the cable 300, into a standardized digital video signal. Reference numeral 231 represents an encoder circuit which converts the standardized digital video signal into a multiplexed composite signal which is output from a video signal output connector 234. Reference numeral 232 represents a memory circuit which stores a digital video signal from the signal processing circuit 230 and host terminal 400 and controls an image memory read/write. The bus I/F circuit 235 is connected to a bus of the host terminal 400. The bus I/F circuit 235 transfers the digital video signal and control data between the host terminal 400 and image processing unit 200, and controls the memory circuit 232 in response to an instruction from the host terminal 400. Reference numeral 237 represents a data/control line which is used for bidirectional data communications between the host terminal 400 and image processing unit 200, and is connected to a control port of the system control unit 233.

With the video input apparatus constructed as above, the operations of the camera unit 100 and image processing unit 200 can be controlled by the host terminal 400 via the bus I/F circuit 235. For example, in order to change a shutter speed, a shutter speed control command is transferred from the host terminal 400 via the data line 237 of the bus I/F circuit 235 to the system control unit 233 of the image processing unit 200. The system control unit 233 analyzes the received command, and if it is a shutter speed control command, this command is supplied via the data line 126 of the cable 300 to the system control unit 124 of the camera unit 100. Upon reception of this command, the camera unit 100 controls the image pickup element driving circuit 123 to change the shutter speed.

The data transfer procedure of the system control units 233 and 124 of the image processing unit 200 and camera unit 100 is illustrated in FIG. 10. Referring to FIG. 10, when the system control unit 124 of the camera unit 100 receives command data from the system control unit 233 of the image processing unit 200 (S1001), it is checked whether there is any error such as a check sum error, and if an error is detected, an abnormal reception notice is supplied to the system control unit 233 of the image processing unit 200 by using an ACK (acknowledge) frame (S1001). Upon reception of the abnormal reception notice, the system control unit 232 of the image processing unit 200 retransmits the command (S1003, S1005). If an error is not detected, a normal reception notice is supplied to the system control unit 233 of the image processing unit 200 by using the ACK frame (S1006). If an error is detected, an abnormal reception notice is supplied to the system control unit 233 of the image processing unit 200 by using an ACK frame (S1002, S1004).

As above, by detecting an error of data transmission and retransmitting a command when an error is detected, the host can control the camera unit 100 reliably.

The conventional apparatus described above is, however, associated with the following problem. In optimizing a video signal of the camera unit 100 with an AF (auto focus) control function and an AE (auto exposure) control function, it is necessary to read the frequency characteristics and luminance data of a subject necessary for optimization, from the signal processing circuit 230 of the image processing unit 200 and to transmit the read data to the camera unit 100 for the feedback control. This data is read from the signal processing circuit 200 synchronously with the V (vertical) sync signal of video synchronization, and is therefore called V sync data. Data transmission interval is short while this V sync data is transmitted from the image processing unit 200 to the camera unit 100. Therefore, if the procedure of error detection and retransmission illustrated in FIG. 10 is used, the timing of data transmission may be lost.

SUMMARY OF THE INVENTION

The invention has been made in consideration of the above problem. It is an object of the present invention to provide an image input apparatus capable of optimizing an error recovery process during data transmission between a camera unit and an image processing unit.

In order to achieve the above object, the present invention provides an image input apparatus having separated camera unit and image processing unit connected with each other by a cable, comprising data transmission/reception means for transferring data between the camera unit and image processing unit; first frame configuration means for configuring a command data frame for controlling the camera unit; second frame configuration means for configuring a video sync data frame to be transferred between the camera unit and image processing unit synchronously with a video sync signal for the optimization of an output video signal; frame discriminating means for discriminating between the command data frame and the video sync data frame; error detecting means for detecting an error of a received data frame; error notifying means for notifying a transmission side of an error detection when an error is detected in the received data frame; and frame retransmission means for retransmitting a transmission frame when the error notice is received from a reception side.

The other objects and advantages of the present invention will become apparent from the following detailed description of the embodiment when read in conjunction with the accompanying drawings.

BRIEF DESCRIPTION OF THE DRAWINGS

FIGS. 6A and 6B are sequence diagrams illustrating transmission/reception of V sync data used by the image input apparatus of the embodiment.

DETAILED DESCRIPTION OF THE PREFERRED EMBODIMENTS

Figure 1:
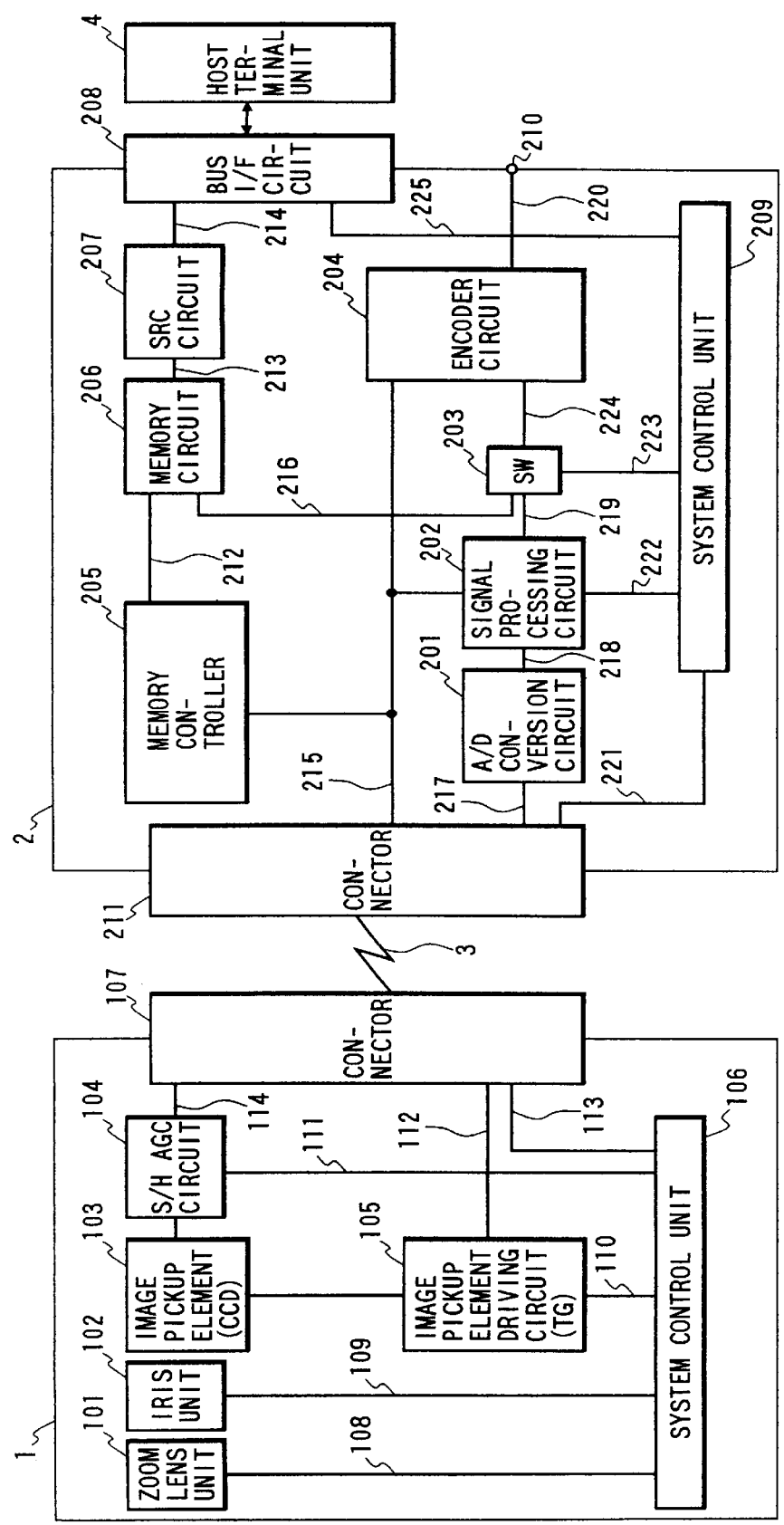
FIG. 1 is a block diagram showing the structure of an image input apparatus according to an embodiment of the invention.

An embodiment of the invention will be described with reference to the accompanying drawings. FIG. 1 is a block diagram showing the structure of an image input apparatus according to an embodiment of the invention. In FIG. 1, reference numeral 1 represents a camera unit, reference numeral 2 represents an image processing unit. The camera unit 1 and image processing unit 2 are connected by a cable 3.

The image processing unit 2 is connected to a host terminal 4 via a bus I/F (interface) circuit 208. The host terminal 4 controls via the bus I/F circuit 208 the image processing unit 2 and camera unit 1.

The structure of the camera unit 1 will be described. The camera unit 1 has a system control unit 106 made of a one-chip microcomputer having a CPU (central processing unit), a ROM (read-only memory), a RAM (random access memory), and functions of, for example, a control board and a communication board. The system control unit 106 controls each device of the camera unit 1 to perform an AF (auto focus) control and an AE (auto exposure) control and to perform bidirectional communications to and from the image processing unit 2. Reference numeral 101 represents a zoom lens unit which is constituted by an image pickup lens, a zoom motor, a zoom motor driving circuit, a focus motor, and a focus motor driving circuit. A control signal line 108 is connected to a control board of the system control unit 106 which drives the zoom lens unit 101 upon reception of an instruction from the host terminal 4.

Reference numeral 102 represents an iris unit which is constituted by an iris, an iris motor, an iris motor driving circuit, and an iris encoder. The iris unit 102 is controlled by a control signal supplied from the system control unit 106 via a control signal line 109 to adjust the iris and the amount of incident light through the zoom lens unit 101. Reference numeral 103 represents an image pickup element such as a CCD which photoelectrically converts an image passed through the zoom lens unit 101 and iris unit 102 into an electrical signal. Reference numeral 105 represents an image pickup element driving circuit such as a TG (timing generator) which controls the accumulation operation, read operation, and reset operation of the image pickup element 103 in response to control signals supplied from the system control unit 106 via a control signal line 110 to thereby change the shutter speed. The image pickup element driving circuit 105 outputs a video sync signal 112.

Reference numeral 104 represents an S/H AGC circuit for a sampling and holding operation to reduce noises of accumulated charges and for a gain adjustment operation of an image pickup signal, this circuit outputting an image pickup signal to an image pickup signal line 114. The S/H AGC circuit 104 is controlled by control signals from the system control unit 106 to thereby change the gain of the image pickup signal 114. Reference numeral 107 represents a connector for detachably connecting the cable 3. Reference numeral 113 represents a data and data control line used for bidirectional data communication between the camera unit 1 and image processing unit 2, this line being connected to a serial communication port of the system control unit 106.

Next, the image processing unit 2 will be described. The image processing unit 2 has a system control unit 209 made of a one-chip microcomputer having a CPU, a ROM, a RAM, and functions of, for example, a control board and a communication board. The system control unit 209 performs a control of each device of the image processing unit 2, a control of an auto-white balance, a communication to and from the camera unit 1, a communication to and from the host terminal 4 via the bus I/F circuit 208, and an operation control by analyzing a command from the host terminal 4.

Reference numeral 211 represents a connector for detachably connecting the cable 3. Reference numeral 201 represents an A/D conversion circuit which converts an image pickup signal on an image pickup signal line 217 transferred from the camera unit 1 via the cable 3, into a digital signal on a digital signal line 218. Reference numeral 202 represent a signal processing circuit for converting a digital image pickup signal on the image pickup signal line 218 into a standardized digital video signal 219.

Reference numeral 204 represents an encoder circuit which converts the standardized digital video signal from a digital video signal line 224 into a multiplexed composite signal which is output via a composite signal line 220 from a video signal output connector 210. Reference numeral 206 represents an image memory circuit which stores a digital video signal from the signal processing circuit 202 and an SRC circuit 207 to be described later. Reference numeral 205 represents a memory controller for controlling read/write of the image memory 206. The SRC (scan rate converter) circuit 207 compensates for an aspect ratio difference between the digital video signal flowing on a digital video signal line 213 of the image processing unit 2 and the digital video signal flowing on a digital video signal line 214 of the host terminal 4. Reference numeral 203 represents a switch (SW) circuit made of a switching element or the like which selects one of the digital video signal on the digital video signal line 219 from the signal processing circuit 202 and the digital video signal on the digital video signal line 216 from the image memory 206, in response to a control signal supplied from the system control unit 209 via a control line 223, and outputs the selected digital video signal to the encoder circuit 204 via a digital video signal line 224.

The bus I/F circuit 208 is connected to the bus of the host terminal 4 to perform data transfer of the digital video signal on the digital video signal line 214 and the control data on a parallel data and parallel data control line 225, between the host terminal 4 and image processing unit 2, and is used for a control of the memory controller 205 and SRC circuit 207 by the host terminal 4. Reference numeral 215 represents a video sync signal line on which a video sync signal of the image processing unit 2 corresponding to the video sync signal 112 of the camera unit 1 flows, which sync signal is supplied to the signal processing circuit 202, memory controller 205, and encoder circuit 204. Reference numeral 221 represents a serial data and serial data control line which is used for bidirectional data communication between the camera unit 1 and image processing unit 2, and connected to a serial data port of the system control unit 209.

Reference numeral 225 represents a parallel data and parallel data control line which is used for bidirectional data communication between the host terminal 4 and image processing unit 2, and connected to a control port of the system control unit 209.

Figure 2A:
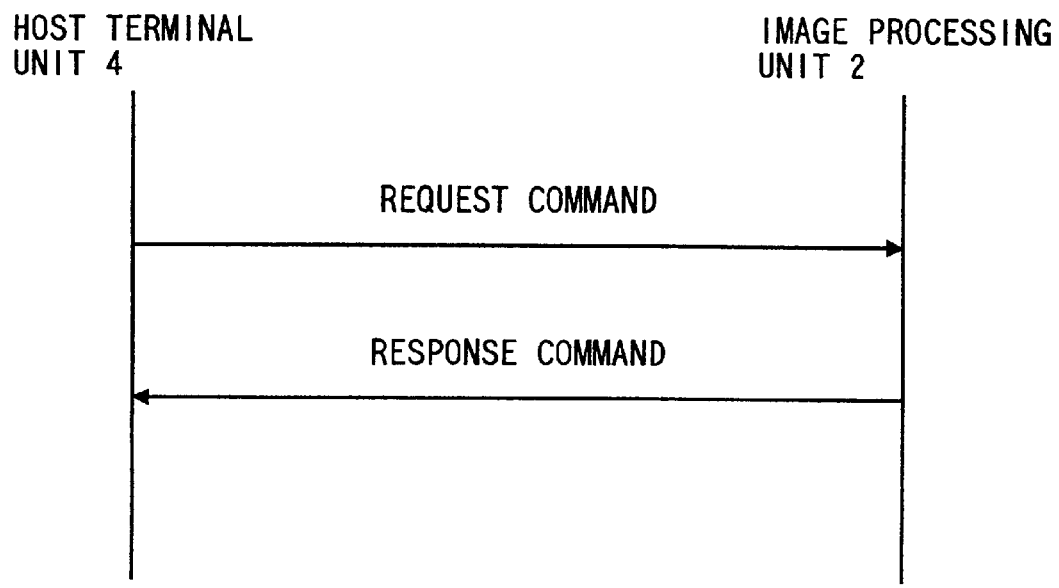
FIGS. 2A and 2B are diagrams explaining commands used by the image input apparatus of the embodiment.
Figure 2B:
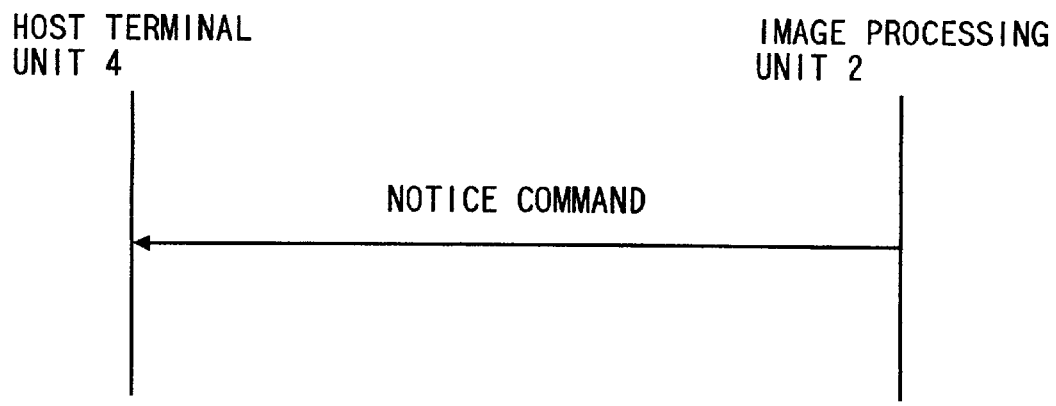

FIGS. 2A and 2B illustrate control commands to be transferred to and from the host terminal 4 via the parallel data and parallel data control line 225.

A request command shown in FIG. 2A is a command used by the host terminal 4 to request an operation of the image processing unit 2 or camera unit 1. The request command for the image processing unit 2 includes an initializing request, a white balance control request, and the like. The request command for the camera unit 1 includes a zoom request, an exposure control request, and the like. A response command shown in FIG. 2A is a command responding to the request command and is issued to the host terminal 4 when the operation requested by the host terminal 4 is completed by the camera unit 1 or image processing unit 2.

A notice command shown in FIG. 2B is a command to be notified to the host terminal 4 when the camera unit 1 or image processing unit 2 detects any error or the like.

Two kinds of data including a host control command data and V sync data are transferred via the cable 3 between the camera unit 1 and image processing unit 2. The host control command is a command to be transferred between the host terminal 4 and camera unit 1 via the image processing unit 2. The V sync data is used when the AF control data and AE control data read from the signal processing circuit 202 are supplied to the camera unit 1 and when the gain value of the S/H AGC circuit 104 and the shutter speed of the image pickup element driving circuit 105 are supplied from the camera unit 1 to the image processing unit 2. The V sync data is transferred between the camera unit 1 and image processing unit 2 for each of the video sync signal line 112 and V (vertical) sync signal line 215.

Figure 3A:
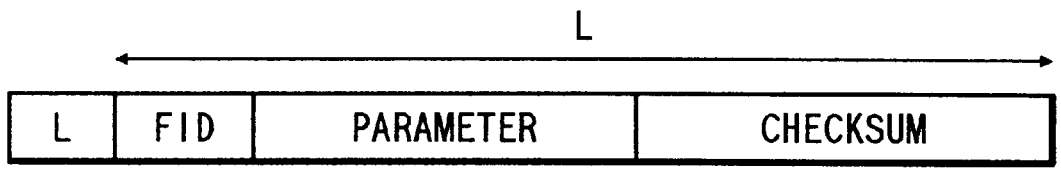
FIGS. 3A and 3B are diagrams showing the structure of data frames used by the image input apparatus of the embodiment.
Figure 3B:
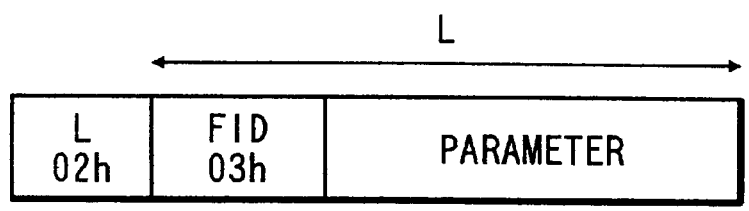

FIGS. 3A and 3B are diagrams showing the structures of data frames to be transferred between the camera unit 1 and image processing unit 2. FIG. 3A shows the data format. An L field stores a frame length and indicates the number of data bytes constituting the frame. An FID field stores a frame identifier which is used for identifying the attribute of the frame. The attribute of the frame includes three types, a command frame, a V sync data frame, and an ACK frame. The command frame is used for the transfer of a host control command, the V sync data frame is used for the transfer of V sync data, and the ACK frame is a reception notice frame which is sent from the reception side to the transmission side when the command frame or V sync data frame is received.

FIG. 3B shows the structure of the ACK frame. The ACK frame has a fixed frame length of two bytes. If the parameter is "0", it means a normal reception, whereas if the parameter is not "0", it means a reception error and the error factor is indicated by the contents of the parameter.

Figure 4:
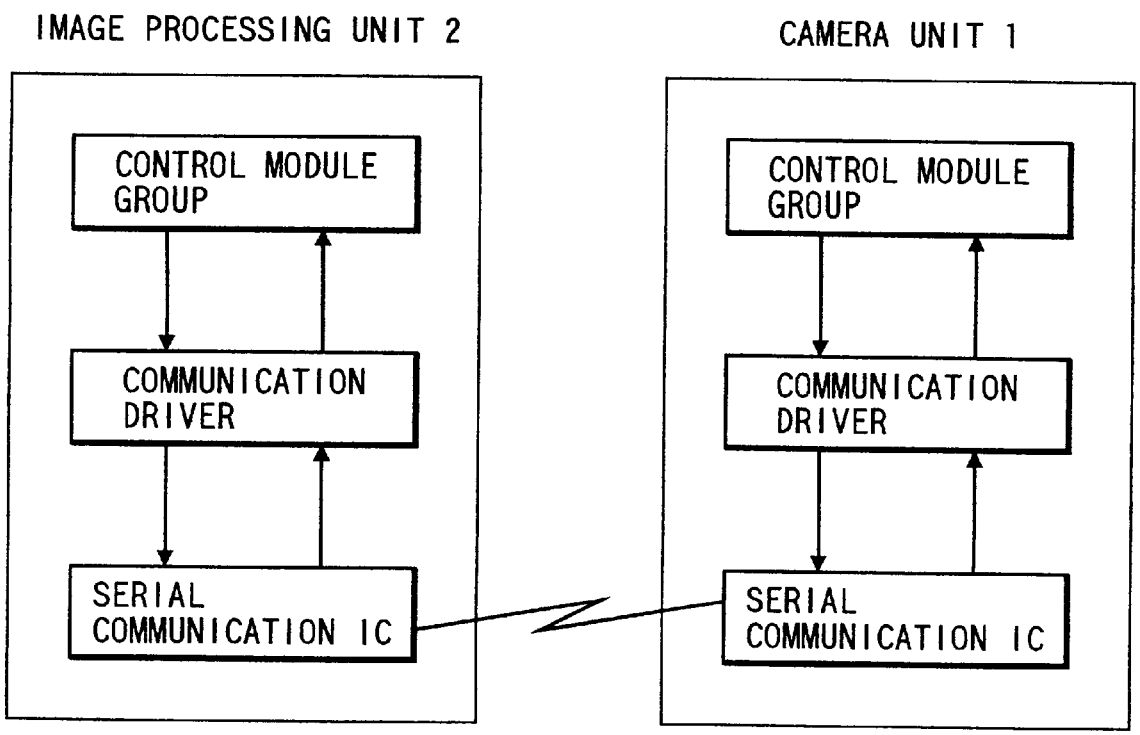
FIG. 4 is a diagram showing the structure of communication module groups used by the image input apparatus of the embodiment.

FIG. 4 shows the module structure used by data communication between the camera unit 1 and image processing unit 2. In FIG. 4, a serial communication IC (integrated circuit) is a module built in a one-chip microcomputer. A communication drive controls the serial communication IC to provide an upper level control module with a communication function. A control module group of the camera unit 1 includes a zoom control module, an AF control module, an AE control module, and the like. The control module group of the image processing unit 2 includes an auto white balance (AWB) control module, and the like.

Figure 5A:
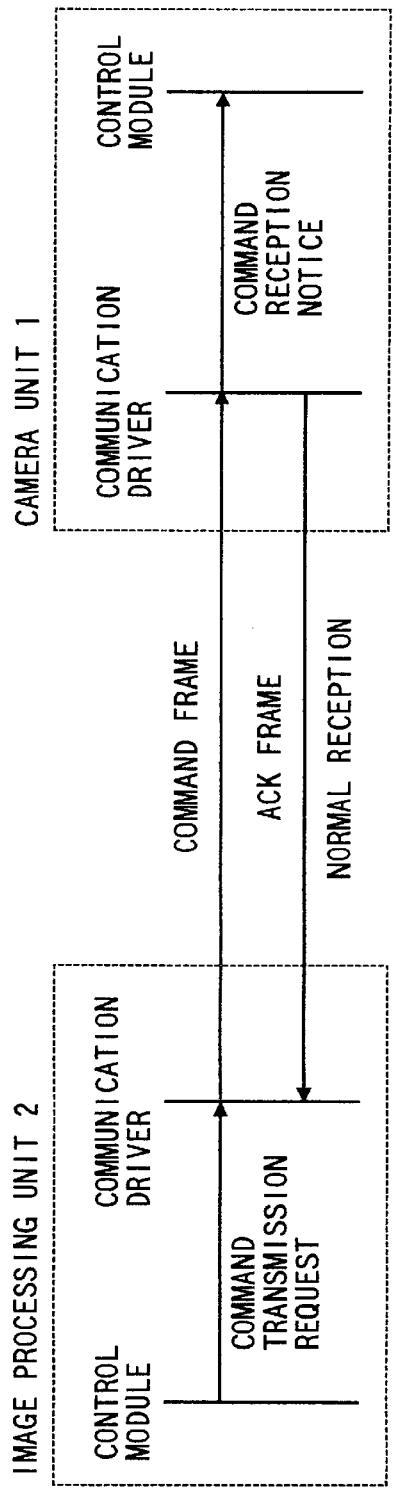
FIGS. 5A and 5B are sequence diagrams illustrating transmission/reception of command frames used by the image input apparatus of the embodiment.
Figure 5B:
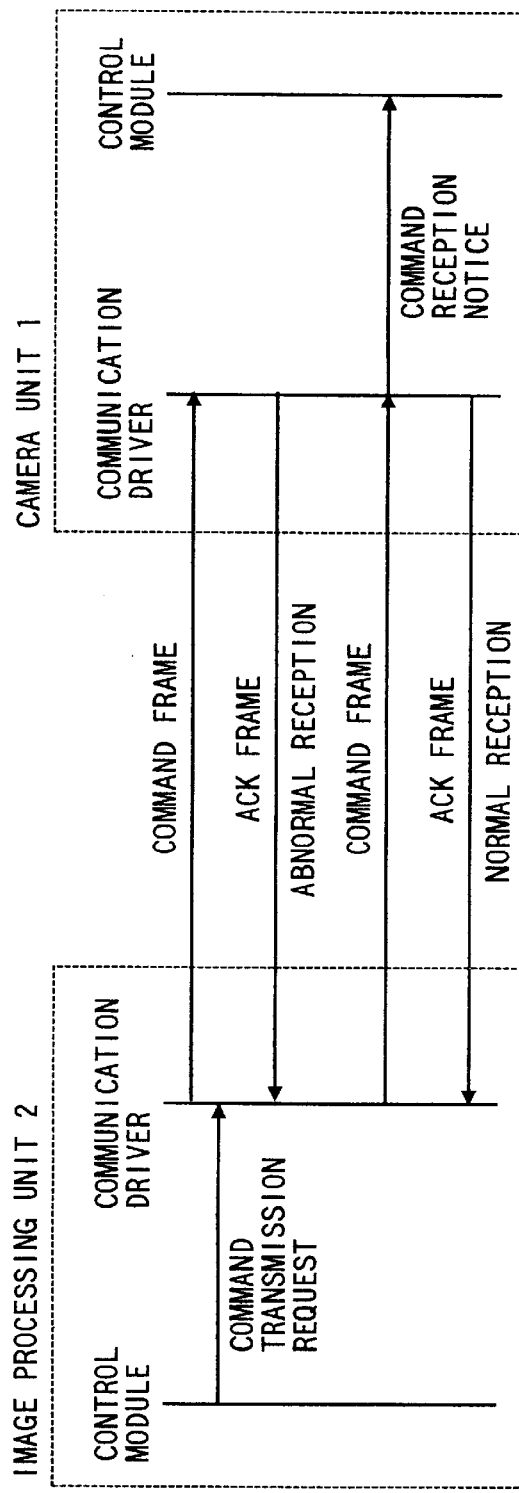

FIGS. 5A and 5B are sequence diagrams illustrating transfer of command frames.

FIG. 5A is a sequence diagram illustrating the operation when a command frame is transmitted from the image processing unit 2 to the camera unit 1. The control module of the image processing unit 2 issues a command transmission request to the communication driver. The communication driver configures the command frame shown in FIG. 3A, and controls the serial communication IC to transmit the data of the command frame to the camera unit 1. The communication driver of the camera unit 1 checks the check sum of the received frame, and if there is no error, an ACK frame added with a normal reception parameter is transmitted to the image processing unit 2 and notifies the upper level control module of a command reception notice.

FIG. 5B is a sequence diagram illustrating the operation when a command frame is transmitted from the image processing unit 2 to the camera unit 1 and an error occurs. After the communication driver of the camera unit 1 checks the check sum, an ACK frame added with a reception error parameter is transmitted to the image processing unit 2. Upon reception of this ACK, the communication driver of the image processing unit 2 retransmits the command frame. The communication driver of the camera unit 1 checks the check sum of the received frame, and if there is no error, an ACK frame added with a normal reception parameter is transmitted to the image processing unit 2, and the upper level control module is notified of a command reception notice. The command communication sequence from the camera unit 1 to image processing unit 2 is similar to the above.

FIGS. 6A and 6B are sequence diagrams illustrating transfer of V sync data.

FIG. 6A is a sequence diagram for transmission of V sync data from the image processing unit 2 to camera unit 1. The control module of the image processing unit 2 issues a V sync data transmission request to the communication driver. The communication driver configures the V sync data frame shown in FIG. 3A and controls the serial communication IC to transmit the V sync data frame to the camera unit 1. The communication driver of the camera unit 1 checks the check sum of the received frame, and if there is no error, the V sync data reception notice is supplied to the upper level control module.

FIG. 6B is a sequence diagram illustrating the operation when an error is detected in the V sync data frame transmitted from the image processing unit 2 to camera unit 1. The communication driver of the camera unit 1 checks the check sum, and discards the received frame with an error detected. The command transmission sequence from the camera unit 1 to image processing unit 2 is similar to the above.

Figure 7:
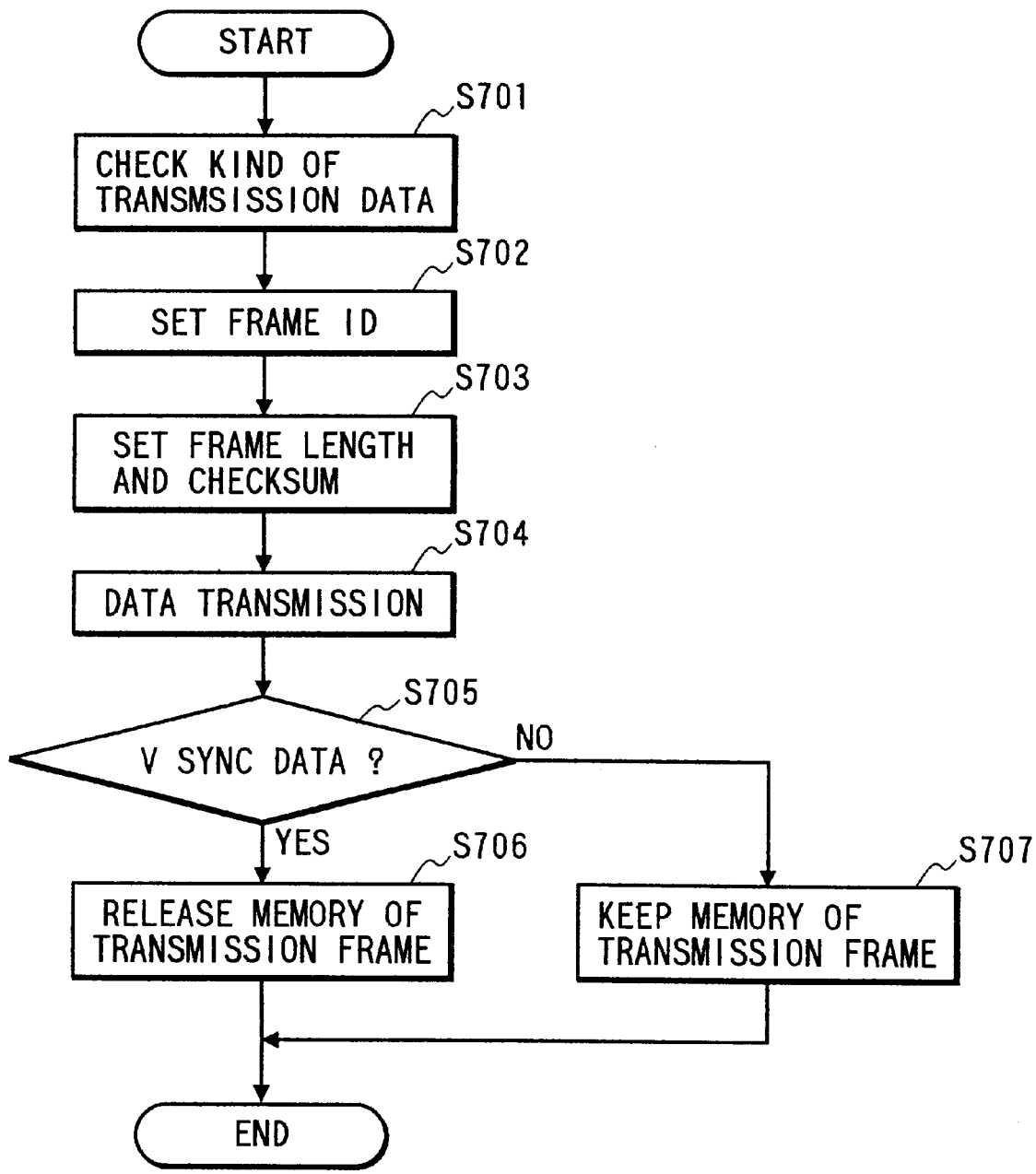
FIG. 7 is a flow chart illustrating the operation of a communication driver on a transmission side of the image input apparatus of the embodiment.
Figure 8:
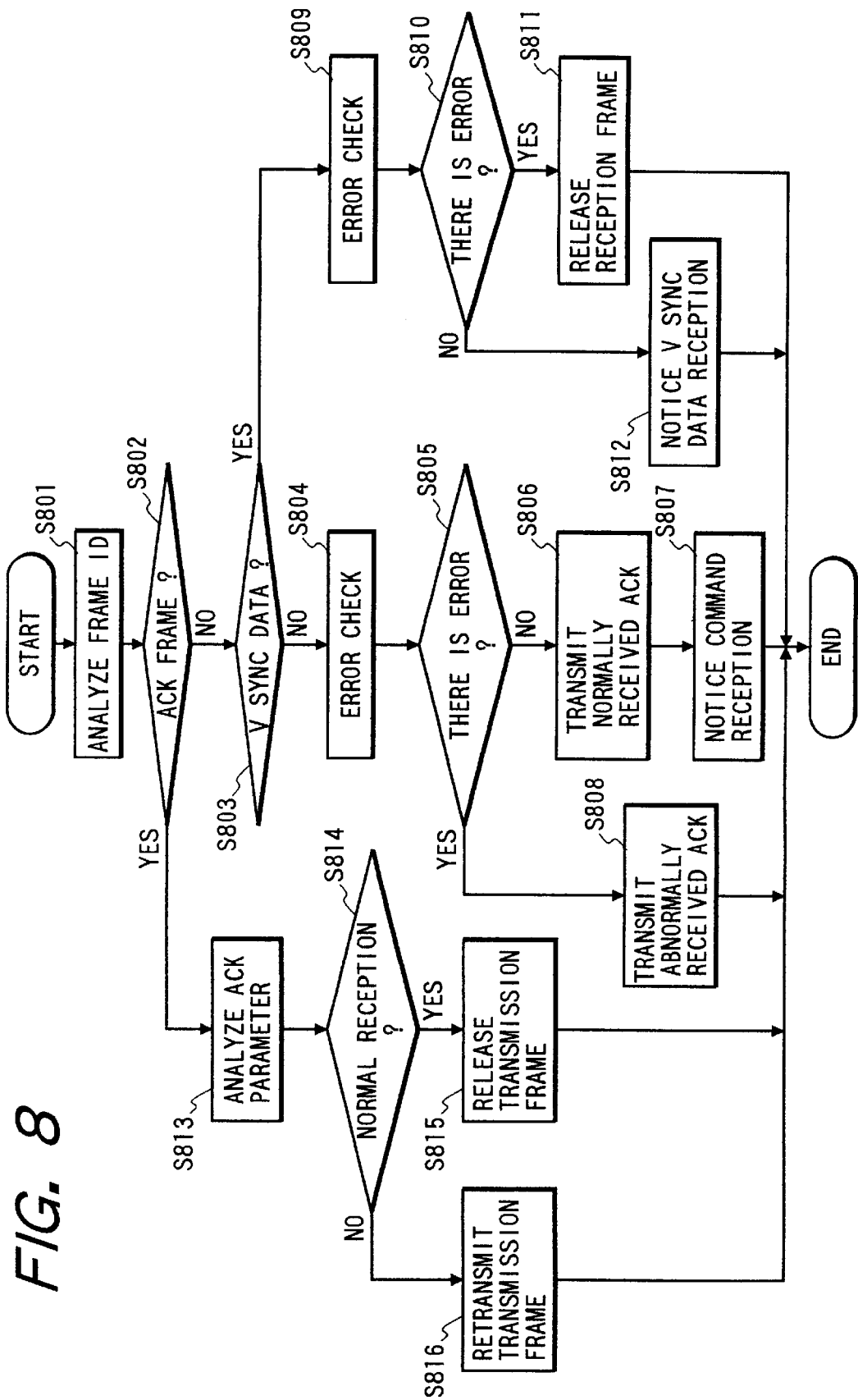
FIG. 8 is a flow chart illustrating the operation of a communication driver on a reception side of the image input apparatus of the embodiment.
Figure 9:
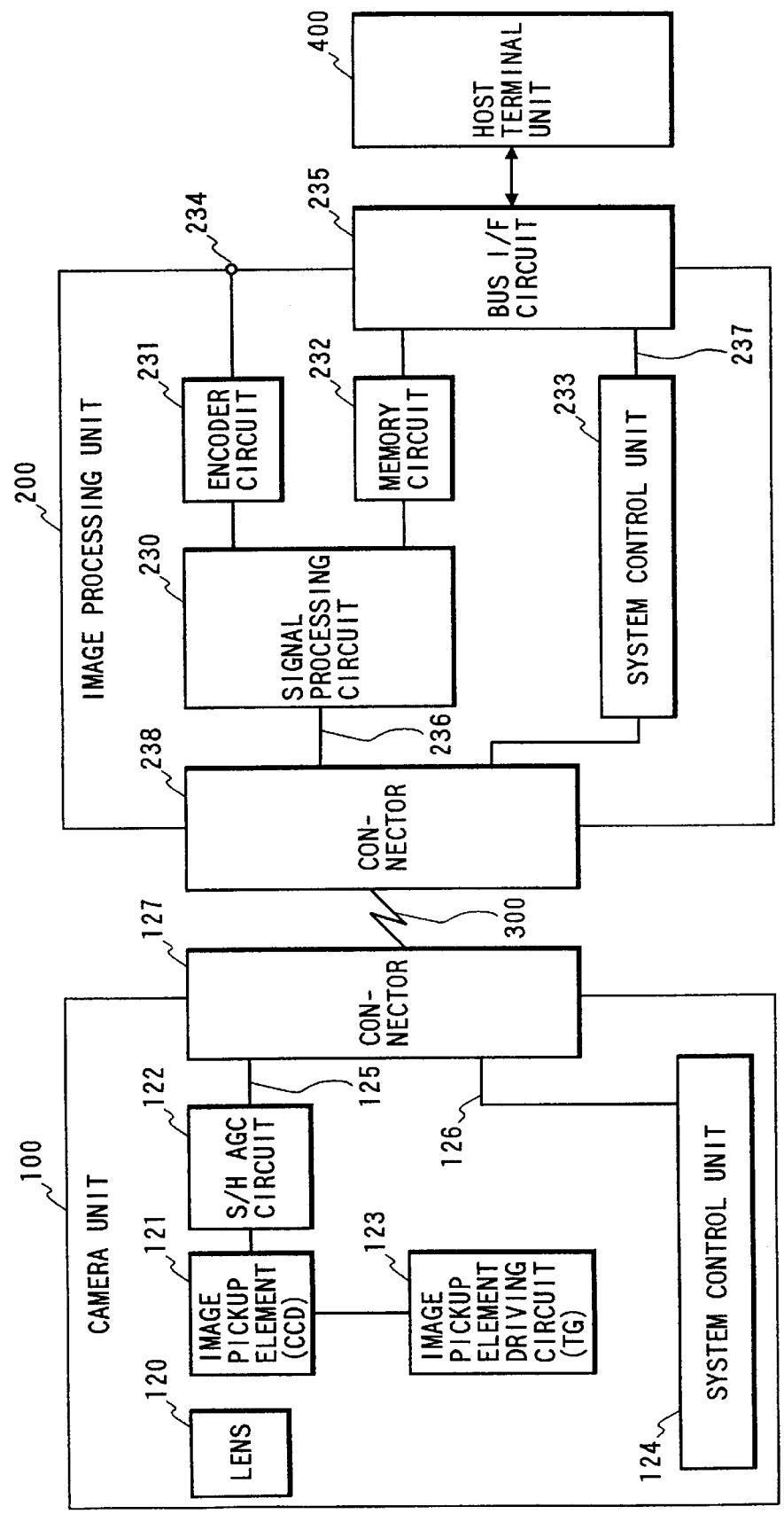
FIG. 9 is a block diagram showing the structure of a conventional image input apparatus.
Figure 10:
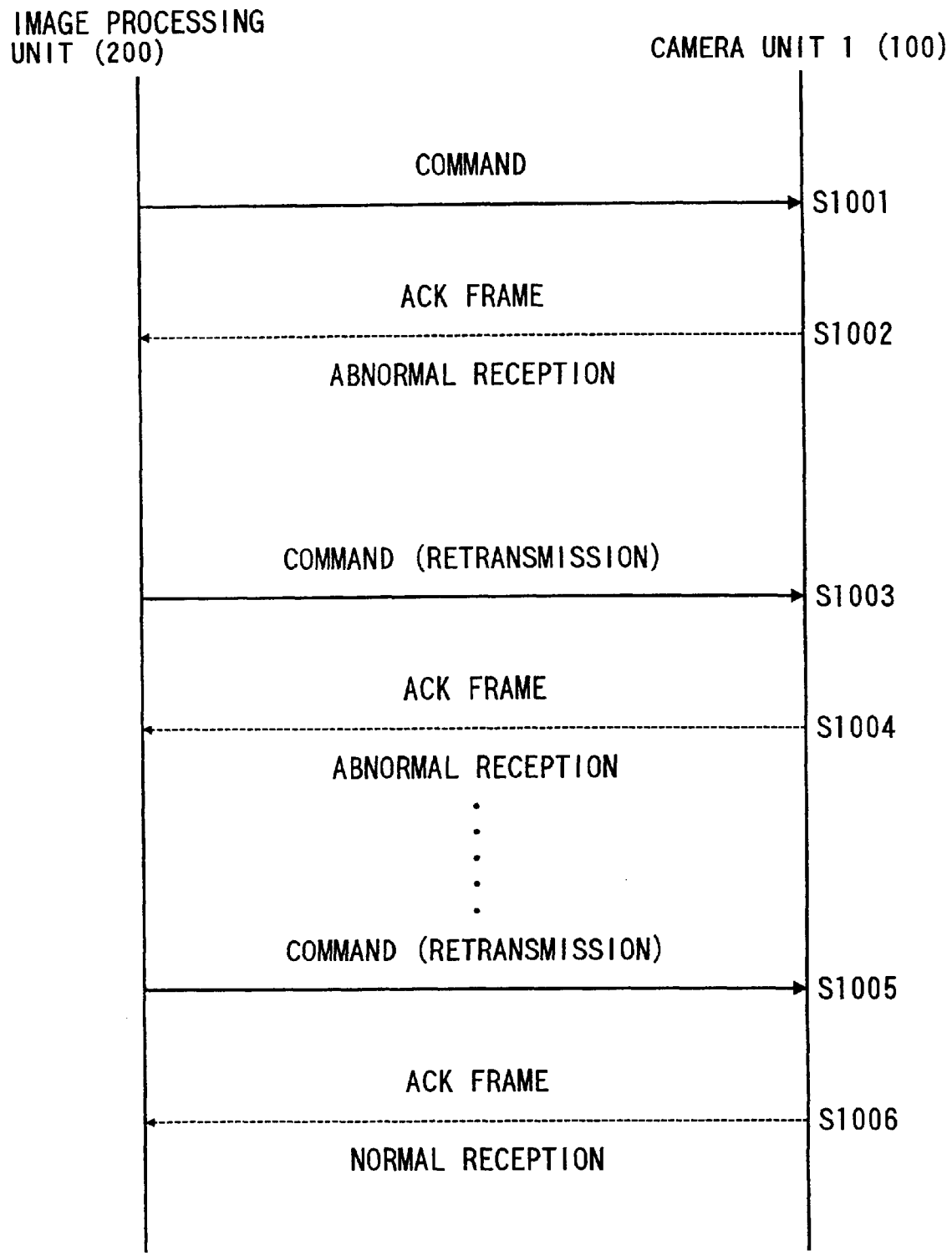
FIG. 10 is a sequence diagram illustrating the procedure of command transfer by a conventional image input apparatus.

The sequential operations for the control of transmission/reception by the communication drivers will be described with reference to the flow charts shown in FIGS. 7 and 8.

First, the operation of the communication driver on the transmission side will be described with reference to FIG. 7. At Step S701, it is checked whether a transmission request from an upper level module is a command or V sync data. Next, at Step S702, a frame ID (identifier) is set in accordance with the contents checked at Step S701. Next, at Step S703, a frame length and a check sum are calculated and set. Next, at Step S704, the serial communication IC is controlled to transmit the frame. Next, at Step S705, it is checked whether the frame transmitted at Step S704 is a V sync data frame. If the frame is the V sync data frame, the flow advances to Step S706, whereas if not, the frame is a command frame so that the flow advances to Step S707. At Step S706, a buffer memory reserved for the frame transmission is released. At Step S707, for the preparation of retransmission in the case of error occurrence, the buffer memory reserved for the frame transmission is maintained reserved. After executing Step S706 or Step S707, this sequence is terminated.

Next, the operation of the communication driver on the reception side will be described with reference to FIG. 8. At Step S801, an FID (frame ID) of the received frame is analyzed. Next, at Step S802, it is checked whether the FID indicates an ACK frame. In the case of the ACK frame, the flow advances to Step S813, whereas if not, the flow advances to Step S803 whereat it is checked whether the FID indicates a V sync data frame. If the V sync data frame, the flow advances to Step S809, whereas if not, it means the command frame so that the flow advances to Step S804 whereat the check sum is checked, and at Step S805 it is checked whether there is any error. If there is any error, the flow advances to Step S808 whereat an ACK frame added with a reception error notice of the received command frame is transmitted and the sequence is terminated. If there is no error at Step S805, the flow advances to Step S806 whereat an ACK frame with a command frame normal reception notice is transmitted. Next, at Step S807, a command reception is notified to the upper level module to terminate the sequence.

At Step S809, the check sum is checked, and at Step S810 it is checked whether there is any error. If there is any error, the flow advances to Step S811 whereat the buffer memory for the received V sync data frame is released to discard the received frame to terminate this sequence. If there is no error at Step S810, the flow advances to Step S812 whereat a V sync data frame reception is notified to the upper level module to terminate this sequence.

At Step S813, the parameter of the ACK frame is analyzed. Next, at Step S814, it is checked whether the parameter of the ACK indicates a normal reception. If normal, the flow advances to Step S815, whereas if abnormal reception, the flow advances to Step S816. At Step S815, the buffer memory for the transmitted frame reserved at Step S707 shown in FIG. 7 is released to terminate this sequence. At Step S816, the transmitted frame reserved at Step S707 shown in FIG. 7 is retransmitted to terminate this sequence.

As detailed above, according to the image input apparatus of this invention, when an error occurs in a command data frame, the command data frame is retransmitted, and when an error occurs in a video sync data frame, it is not retransmitted. The error recovery process is performed differently between the command data frame and video sync data frame. Accordingly, the error recovery process for data transfer between the camera unit and image processing unit can be optimized.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image input apparatus having separated camera unit and image processing unit connected with each other by a communication path, comprising:

data transmission/reception means for transferring data between the camera unit and image processing unit;

first frame configuration means for configuring a command data frame for controlling the camera unit;

second frame configuration means for configuring a video sync data frame to be transferred between the camera unit and image processing unit synchronously with a video sync signal for the optimization of an output video signal;

frame discriminating means for discriminating between the command data frame and the video sync data frame;

error detecting means for detecting an error of a received data frame;

error notifying means for notifying a transmission side of an error detection when an error is detected in the received data frame; and frame retransmission means for retransmitting data corresponding to said command data frame when an error notice regarding the command data is received from a reception side and for not retransmitting data corresponding to said video sync data frame when an error notice regarding the video sync data is received from the reception side.

2. An image input apparatus according to claim 1, wherein said image processing unit is mounted on an expansion slot of a computer.

3. An image processing apparatus separated from a camera unit and connected to the camera unit by a communication path, comprising:

data transmission/reception means for transferring data to and from the camera unit;

first frame configuration means for configuring a command data frame for controlling the camera unit;

second frame configuration means for configuring a video sync data frame to be transferred to and from the camera unit synchronously with a video sync signal for the optimization of an output video signal;

frame discriminating means for discriminating between the command data frame and the video sync data frame;

error detecting means for detecting an error of a received data frame from the camera unit; and control means for retransmitting command data frame when an error notice regarding the command data is received from said camera unit and for not retransmitting data relating to said video sync data frame when an error notice regarding the video sync data is received from the camera unit.

4. An image processing apparatus according to claim 3, wherein said image processing unit is mounted on an expansion slot of a computer.

5. An image pickup apparatus separated from an image processing unit and connected with each other to the image processing unit by a communication path, comprising:

data transmission/reception means for transferring data to and from the image processing unit;

first frame configuration means for configuring a command data frame for controlling the image pickup apparatus;

second frame configuration means for configuring a video sync data frame to be transferred to and from the image processing unit synchronously with a video sync signal for the optimization of an output video signal;

frame discriminating means for discriminating between the command data frame and the video sync data frame;

error detecting means for detecting an error of a received data frame from the image processing unit; and error notifying means for notifying a transmission side of an error detection when an error is detected in the received data frame, to make said image processing unit retransmit said command data frame when an error regarding the command data is detected and to make said image processing unit not retransmit data with regard to said video sync data frame when an error regarding the video sync data is detected.

6. An image pickup apparatus according to claim 5, wherein said image processing unit is mounted on an expansion slot of a computer.

* * * * *